United States Patent
Chang et al.

(10) Patent No.: US 7,444,167 B2
(45) Date of Patent: Oct. 28, 2008

(54) DUAL-BAND WIRELESS LAN RF TRANSCEIVER

(75) Inventors: Sheng-Fuh Chang, 3F No. 2-1, Industry East Rd. 1, Science-Based Industrial Park, Hsinchu (TW); Wen-Lin Chen, Hsinchu (TW); Cheng-Hua Tsai, Hsinchu (TW); Chin-Hung Chien, Hsinchu (TW); Hung-Cheng Chen, Hsinchu (TW); Shu-Fen Tang, Hsinchu (TW); Albert Chen, Hsinchu (TW)

(73) Assignees: Integrated System Solution Corp., Hsinchu (TW); Sheng-Fuh Chang, Hsinchu (TW)

( * ) Notice: Subject to any disclaimer, the term of this patent is extended or adjusted under 35 U.S.C. 154(b) by 706 days.

(21) Appl. No.: 11/149,230

(22) Filed: Jun. 10, 2005

(65) Prior Publication Data
US 2006/0281488 A1    Dec. 14, 2006

(51) Int. Cl.
*H04Q 7/32* (2006.01)
(52) U.S. Cl. .............. 455/553.1; 455/552.1; 455/550.1; 455/73; 455/426.1; 455/84
(58) Field of Classification Search ............... 455/553.1, 455/552.1, 550, 73, 86, 84, 550.1, 551, 422.1, 455/403, 426.1, 426.2
See application file for complete search history.

(56) References Cited

U.S. PATENT DOCUMENTS 7,251,459 B2 *    7/2007    McFarland et al. .......... 455/101

2001/0041584 A1 *    11/2001    Watanabe ................... 455/553
2006/0276222 A1 *    12/2006    Rofougaran ............. 455/552.1

OTHER PUBLICATIONS

Article entitled "A Dual-Band RF Transceiver for Multi-Standard WLAN Applications" by Sheng-Fuh R. Chang et al. Member IEEE, pp. 1-17, no date available.
Article entitled "Concurrent Multiband Low-Noise Amplifiers—Theory, Design, and Applications" by H. Hashemi et al., Student Member, IEEE, published in IEEE Transactions on Microwave Theory and Techniques, vol. 50, No. 1, Jan. 2002, pp. 288-301, no date available.

* cited by examiner

*Primary Examiner*—Keith T Ferguson
(74) *Attorney, Agent, or Firm*—Muncy, Geissler, Olds, & Lowe PLLC

(57) ABSTRACT

The present invention discloses a dual-band RF transceiver. The transceiver comprises a first module, used as the RF front-end of the dual-band transceiver and used for receiving and transmitting a first RF signal and a second RF signal; a second module, electrically connected to the first module, used as the IF IQ modulator/demodulator of the dual-band RF transceiver; a third module, electrically connected to the first and the second modules, used as the tripe-band phase-locked frequency synthesizer of the dual-band RF transceiver and used for providing a first local oscillating signal and a second local oscillating signal to the first module, and a third local oscillating signal to the second module. The dual-band RF transceiver according to the present invention realizes the dual-band triple-mode operation of IEEE802.11 a/b/g by a single dual-band RF module, and therefore the circuit size, power dissipation, component count, and cost can be dramatically reduced.

14 Claims, 4 Drawing Sheets

DUAL-BAND WIRELESS LAN RF TRANSCEIVER

BACKGROUND OF THE INVENTION

1. Field of the Invention

The present invention generally relates to a radio frequency (RF) module, and more particularly to a dual-band multi-mode RF module.

2. Description of the Related Art

There has been explosive adoption of wireless LAN technology in the corporate environment and hot-spot areas since the finalization of IEEE 802.11a/b/g and Hiperlan-2 standards. The widely-deployed 802.11b network, operating in the 2.4-GHz Industrial-Scientific-Medical band with 83 MHz bandwidth, provides a maximum data rate of 11 Mbps, whereas the 802.11a and Hiperlan-2 standards, operating in the 5-GHz band with 300 MHz bandwidth, can support up to 54 Mbps data rate by utilizing the orthogonal frequency division multiplexing technique.

The effective coverage area of a single 2.4-GHz 802.11b/g access point is likely greater than that of a 5.2-GHz 802.11a. However, a greater number of users must share the limited 83 MHz spectrum. The data throughput is reduced when many users simultaneously access the 2.4-GHz WLAN network. A straight-forward solution by adding more access points does not necessarily improve throughput because the in-band interference problem emerges as a result of the limited spectrum (83 MHz) shared by multiple access points. In contrast, the 802.11a network experiences less interference problem for multiple access-point deployment because of its smaller coverage area and greater bandwidth allocation (300 MHz bandwidth). From the other aspect of product adoption rate, the 802.11b network has been deployed worldwide so that it is important to maintain the high-data-rate WLAN network backward compatible with the existing 802.11b products. Hence, the 2.4-GHz 802.11b/g and 5.2-GHz 802.11a/Hiperlan-2 networks are complementary and will coexist in the coming years.

The rapid development of the coexistence operation of multi-mode wireless LAN has been driving conventional RF and base-band transceivers to have integrated multi-band and multi-functional characteristics. Conventional dual-band WLAN Transceivers adopt the parallel transceiver topology. Namely, two independent RF modules of 2.4 GHz and 5.2 GHz are combined in parallel with extra band-selection switches, used for switching the 2.4-GHz and 5.2-GHz RF. However, this parallel topology causes larger circuit size, more power dissipation, more component count, and higher cost. Numbers of work have been demonstrated the different integration effort on multi-band, multimode receivers. On the 2.4/5.2 GHz wireless LANs, the concept of concurrent dual-band receiver was proposed by Hashemi and Hajimiri, entitled "Concurrent Multi-band Low-Noise Amplifiers-Theory, Design, and Applications," *IEEE Transactions Microwave Theory and Techniques*, vol. 50, no. 1, pp. 288-301, January 2002,which provides a concurrent amplifier of 2.4 GHz and 5.2 GHz and a dual-band receiving topology. A concurrent dual-band CMOS LNA was analyzed and designed to verify the concurrent circuit concept. Above work is focused on the dual-band integration of the receiver only. No prior art works on the dual-band transmitter.

According to the above problems, there is a need to provide a dual-band transmitting/receiving topology for the 2.4/5.2 GHz WLAN. The modules of the present dual-band RF circuit determine the device characteristics of each dual-band circuit according to the system power, gain and noise. Two independent RF modules of 2.4 GHz and 5.2 GHz are effectively combined together, therefore the circuit size, power dissipation, component count, and cost can be dramatically reduced.

SUMMARY OF THE INVENTION

It is an objective of the present invention to provide a dual-band multi-mode RF transceiver, capable of saving the circuit size, power dissipation, component count, and product cost of the conventional dual-band RF transceiver.

To obtain the above and other objectives, the present invention provides a dual-band RF transceiver, which comprises a first module, a second module, electrically connected to the first module, and a third module, electrically connected to the first and the second modules. The first module is used as the RF front-end of the dual-band transceiver and used for receiving and transmitting a first RF signal and a second RF signal. The second module is used as the intermediate-frequency (IF) in-phase/quadrature (IQ) modulator and demodulator of the dual-band RF transceiver. The third module is used as the triple-band phase-locked frequency synthesizer of the dual-band RF transceiver and used for providing a first local oscillating signal and a second local oscillating signal to the first module, and a third local oscillating signal to the second module.

According to one aspect of the present invention, the first module comprises a dual-band RF filtering unit, electrically connected to a dual-band antenna; a dual-band receiving unit, electrically connected to the dual-band RF filtering unit, and a dual-band transmitting unit, electrically connected to the dual-band RF filtering unit. The dual-band RF filtering unit is used for processing the first RF signal and the second RF signal and transmitting them among the dual-band receiving unit, dual-band transmitting unit, and the dual-band antenna. The dual-band receiving unit is used for processing the first RF signal and the second RF signal and transmitting them to the second module. The dual-band transmitting unit is used for processing the first RF signal and the second RF signal from the second module.

According to one aspect of the present invention, the first module uses the super-heterodyne topology. The first RF signal is the RF signal of the 5.2 GHz WLAN of IEEE 802.11a and the second RF signal is the RF signal of the 2.4 GHz WLAN of IEEE 802.11 b/g.

According to one aspect of the present invention, the dual-band RF filtering unit comprises a dual-band antenna switch; a dual-band RF filter, electrically connected to the dual-band antenna switch; and a dual-band transceiver switch, electrically connected between the dual-band RF filter, the dual-band receiving unit and the dual-band transmitting unit. The dual-band antenna switch is used for switching the first RF signal and the second RF signal. The dual-band RF filter is used for filtering the first RF signal and the second RF signal. The dual-band transceiver switch is used for determining the signal direction of the first RF signal and the second RF signal.

According to one aspect of the present invention, the dual-band receiving unit comprises a dual-band low-noise amplifier; a dual-band gain amplifier; a first dual-band image filter; a first broadband mixer; a first IF filter and a first variable-gain amplifier.

According to one aspect of the present invention, the dual-band transmitting module comprises a second variable-gain amplifier; a second IF filter; a second broadband mixer; a second dual-band image filter; a dual-band driving amplifier and a dual-band power amplifier.

All sub-circuits of the present invention are designed according to the system power, gain, and noise link budget, capable of providing a dual-band transmit/receive topology for the 2.4 and 5.2 GHz WLAN operation bands and capable of dramatically reducing the circuit size, power dissipation, component count, and cost.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE PREFERRED EMBODIMENT

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

The present invention provides a dual-band transmitting/receiving topology for the 2.4/5.2 GHz WLAN. The invention integrates two independent RF modules of 2.4 GHz and 5.2 GHz into a single dual-band RF module, therefore the band-selection switches between the 2.4 GHz and 5.2 GHz are saved. In addition, the single dual-band module of the present invention fully reuses the active and passive devices in the module, so the circuit size, power dissipation, component count, and cost can be dramatically reduced. For achieving higher system sensitivity, the transceiver of the present invention uses the super-heterodyne topology.

Figure 1:
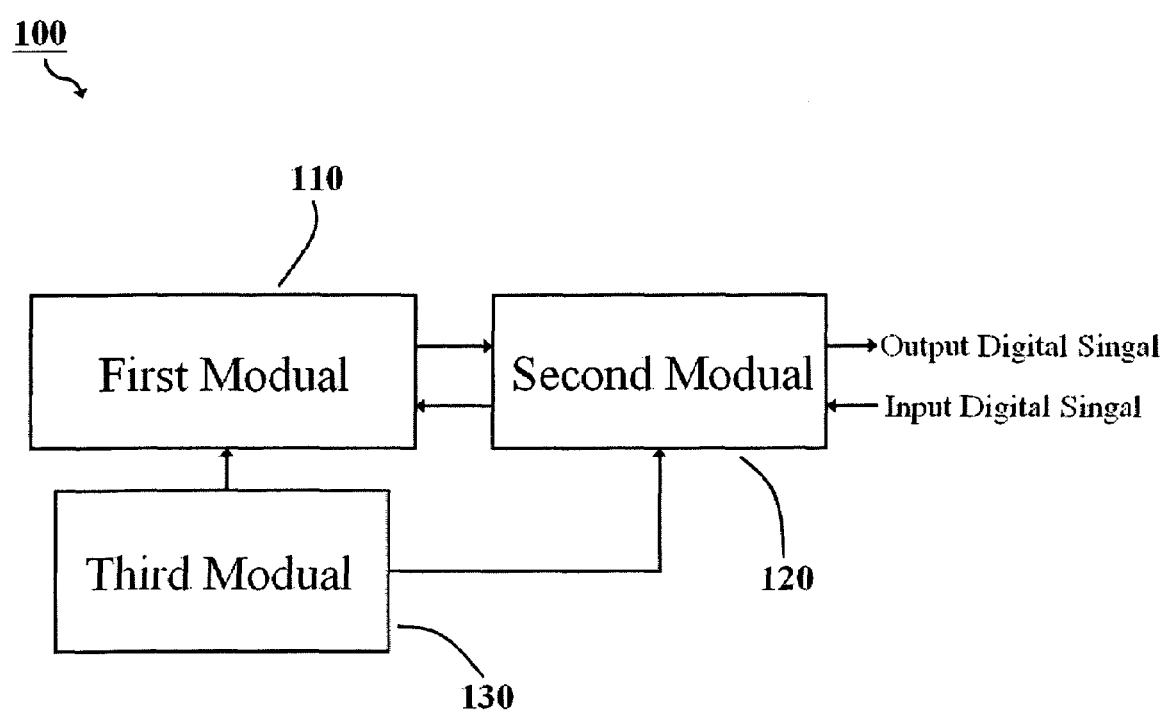
FIG. 1 shows a system block diagram of the dual-band RF transceiver according to the present invention.

Please referring to the FIG. 1, it shows a system block diagram of the dual-band RF transceiver 100 according to the present invention. The dual-band RF transceiver 100 comprises a first module 110, a second module 120, electrically connected to the first module 110, and a third module 130, electrically connected to the first module 110 and the second module 120. The first module 110 is used as the RF front-end of the dual-band transceiver 100 and used for receiving and transmitting a first RF signal and a second RF signal. The second module 120 is used as the IF IQ modulator/demodulator of the dual-band RF transceiver 100. The third module 130 is used as the triple-band phase-locked frequency synthesizer of the dual-band RF transceiver 100 and used for providing a first local oscillating signal and a second local oscillating signal to the first module 110, and a third local oscillating signal to the second module 120.

Figure 2:
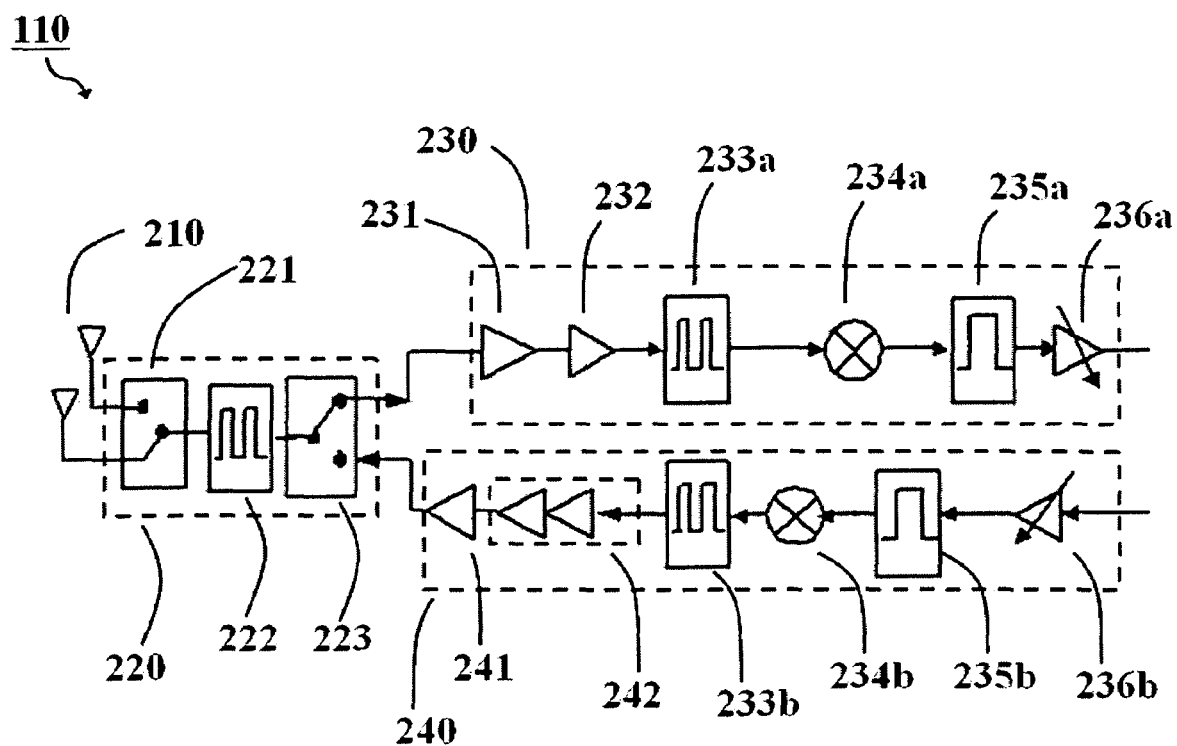
FIG. 2 shows a first module of the dual-band RF transceiver according to the present invention.

Please refer to the FIG. 2. It shows the first module 110 of the dual-band RF transceiver 100 according to the present invention. The first module 110 comprises a dual-band RF filtering unit 220, electrically connected to a dual-band antenna 210; a dual-band receiving unit 230, electrically connected to the dual-band RF filtering unit 220; and a dual-band transmitting unit 240, and electrically connected to the dual-band RF filtering unit 220. The dual-band RF filtering unit 220 is used for processing the first RF signal and the second RF signal and transmitting them among the dual-band receiving unit 230, the dual-band transmitting unit 240, and the dual-band antenna 210. The dual-band receiving unit 230 is used for amplifying and down-converting the first RF signal and the second RF signal and transmitting them to the second module 120. The dual-band transmitting unit 240 is used for up-converting and amplifying the first RF signal and the second RF signal from the second module 120. It is noted that the dual-band RF filtering unit 220, the dual-band receiving units 230, and the dual-band transmitting unit 240 are all concurrent circuits, meaning that a single circuitry has two different operation frequency bands simultaneously.

In a wireless communication transceiver, there are three commonly-used architectures of RF receivers: the direct-conversion architecture (also called as zero intermediate frequency (ZIF) architecture), the low-IF (also called as image-rejection) architecture and the super-heterodyne architecture. The direct-conversion architecture down-converts the desired signal to the baseband signal for further processes such as synchronization, and demodulation. The direct-conversion receiver has the problems of DC offsets, I/Q mismatch, even-order distortion, and flicker noise contamination. The low-IF receiver, down-converting desired signal to the frequency of 2-10 times of the signal bandwidth. Therefore the low-IF architecture has simple circuit topology like the zero-IF architecture while avoiding the zero-IF problems. However, there exists a problem of in-band images, which requires an image-rejection mixer technique to reject those in-band images. The typical requirement of 60-70 dB image rejection imposes stringent phase imbalance and amplitude imbalance on the image-rejection mixer. The super-heterodyne architecture down-converts the desired RF signal to an intermediate-frequency signal through the image filter, mixer, a high quality (Q) IF filter. To make use of the excellent signal dynamic range, sensitivity and selectivity of the super-heterodyne architecture, the first module 110 of the dual-band RF transceiver 100 of the present invention preferably adopts the super-heterodyne architecture.

The first RF signal and the second RF signal processed in the first module 110 are the RF signals of the 5.2 GHz WLAN of IEEE 802.11a and 2.4 GHz WLAN of IEEE 802.11 b/g, respectively. The frequency ranges of the first RF signal and the second RF signal are near 5150-5350 MHz and 2400-2483.5 MHz, respectively. The first module 110 of the present invention uses the super-heterodyne transceiver topology. The suitable intermediate frequency $f_{IF}$ of the system is chosen first to achieve no close-in inter-modulation spurs generated from the mixers.

The dual-band RF filtering unit 220 comprises a dual-band antenna switch 221; a dual-band RF filter 222, electrically connected to the dual-band antenna switch 221; a dual-band transceiver switch 223, electrically connected between the dual-band RF filter 222 and the dual-band receiving unit 230 and the dual-band transmitting unit 240. The dual-band antenna switch 221 is used for switching the first RF signal and the second RF signal. The dual-band RF filter 222 is used for filtering the first RF signal and the second RF signal and the dual-band transceiver switch 223 is used for determining the signal direction of the first RF signal and the second RF signal.

The dual-band antenna 210 can be two separated single-band antennas receiving/transmitting two different RF signals respectively, or a single dual-band antenna having the function of receiving/transmitting two different RF signals simultaneously. The substrate materials of dual-band antenna 210 and the dual-band RF filter 222 can be ceramic, Teflon, alumina, or FR4 substrates according to the application. The circuit patterns of the dual-band antenna 210 and the dual-band RF filter 222 are preferably constructed by the planar types of transmission line. The dual-band RF filter 222 is preferably formed by the hairpin step-impedance-resonator (SIR) dual-band filter, which has the feature of controllable operation frequency, resulted from the multiple resonances of the SIR. For more detailed description, the technology can be found in *Electronics Letters*, vol. 50, pp. 38-39, 2004, reported by the inventors, entitled "Dual-band step-impedance bandpass filter for multimode wireless LANS". The use of planar transmission line of the dual-band RF filter 222 is suitable for the requirement of future electronic product and system integration.

Please refer to FIG. 2. It shows the first module of dual-band RF transceiver according to the present invention. The dual-band receiving unit 230 comprises a dual-band low noise amplifier (LNA) 231; a dual-band gain amplifier 232; a first dual-band image filter 233a; a first broadband mixer 234a; a first IF filter 235a and a first variable-gain amplifier 236a.

The dual-band LNA 231 is used for receiving the first RF signal and the second RF signal from the dual-band transceiver switch 223, and then amplifying the first RF signal and the second RF signal to reduce the noise contribution from the following circuits.

The dual-band LNA 231 adopts the image-parameter method for match circuit design to achieve low noise figure at two different frequency bands simultaneously. The technique has been provided in co-pending U.S. patent application entitle "Dual-band active filter" by the applicant of the present invention, which is incorporated herein by reference.

The dual-band gain amplifier 232 is electrically connected to the dual-band low noise amplifier 231 and used for amplifying the first RF signal and the second RF signal.

The dual-band gain amplifier 232 also adopts the image-parameter method for match circuits to achieve high gain at two different frequency bands simultaneously. The technique has been provided in co-pending U.S. patent application entitle "Bandpass amplifier" by the applicant of the present invention, which is incorporated herein by reference.

The first dual-band image filter 233a is electrically connected to the dual-band gain amplifier and used for filtering the image frequencies of the first RF signal and the second RF signal. The first broadband mixer 234a is electrically connected to the first dual-band image filter 233a and used for mixing the first local oscillating signal of the third module 130 with the first RF signal and for mixing the second local oscillating signal of the third module 130 with the second RF signal to generate a first intermediate-frequency (IF) signal and a second IF signal. The frequency of the first IF signal is designed to be equal to the frequency of the second IF signal. The intermediate frequency (IF) in the present invention is designed at 374 MHz.

The first IF filter 235a is electrically connected to the first broadband mixer 234a and used for suppressing the spurious response generated by the first broadband mixer 234a to obtain the first IF signal and the second IF signal. The first variable-gain amplifier 236a is electrically connected to the first IF filter 235a and used for amplifying the first IF signal and the second IF signal and outputting the first IF signal and the second IF signal to the second module 120. The first IF filter 235a is a surface acoustic wave (SAW) filter. The two IF circuits for the first IF signal and the second IF signal respectively, are integrated to one circuit, which is shared for the first RF signal and the second RF signal, therefore the circuit size, power dissipation, component count, and cost can be dramatically reduced.

The specifications of each circuits of the receiving unit 230 of the first module 110 are determined from the power, gain, and noise link budget. For example, the specifications of the receiving unit 230 of the first module 110 are in accordance with the IEEE 802.11a/b/g. The minimum requirement of sensitivity is −82 dBm at 6 Mbps and the maximum input power is −30 dBm for IEEE 802.11a standard. The minimum requirement of sensitivity is −76 dBm at 11 Mbps and the maximum input power is −20 dBm for ERP-DSSS/CCK mode of IEEE 802.11g standard. Therefore, for example, the IF modulation/demodulation modules can use the RF 2948B chip of RFMD Ltd., where the acceptable input power range of the RF 2948 chip is −53 dBm to 0 dBm. In this range, the AC voltage of the output I/Q signal can achieve the requirement of 700 mV$_{P-P}$. In the first module 110 of the present invention, the input power ranges are −82 dBm to −30 dBm at 5.2 GHz and −76 dBm to −20 dBm at 2.4 GHz and the output power ranges are −53 dBm to 0 dBm. The first module 110 requires the gain of at least 29 dB at 5.2 GHz and 23 dB at 2.4 GHz in the receiving module. In summary, the dual-band circuit specifications of the receiving unit 230 of the first module 110 are determined according to the system power, gain and noise link budgets.

Please referring to FIG. 2, the dual-band transmitting module 240 comprises a second variable-gain amplifier 236b; a second IF filter 235b; a second broadband mixer 234b; a second dual-band image filter 233b; a dual-band driving amplifier 242 and a dual-band power amplifier (PA) 241.

The second variable-gain amplifier 236b is electrically connected to the second module 120 and used for amplifying a third IF signal and the fourth IF signal from the second module 120. The second IF filter 235b is electrically connected to the second variable-gain amplifier 236b and used for suppressing the spurious response generated by the second variable-gain amplifier 236b to obtain the third IF signal or the fourth IF signal.

The second broadband mixer 234b is electrically connected to the second IF filter 235b and used for mixing the first local oscillating signal and the second local oscillating signal of the third module 130 with the third IF signal to generate the first RF signal and the second RF signal.

The second dual-band image filter 233b is electrically connected to the second broadband mixer 234b and used for filtering the spurious response generated by the broadband mixer 234b.

The dual-band driving amplifier 242 is electrically connected to the dual-band image filter 233b and used for amplifying the first RF signal and the second RF signal from the second dual-band image filter 233b.

The dual-band power amplifier 241 is electrically connected to the dual-band driving amplifier 242 and used for raising the power level of the first RF signal and the second RF signal and then outputting to the dual-band transceiver switch 223.

In a wireless communication transmitting module, the RF power amplifier is one of the most power-consuming devices that the high power-added efficiency is at the top design priority. But, on the other hand, since the IEEE 802.11a/g standards use the orthogonal-frequency-division-multiplexing (OFDM) technique, the peak-to-average power ratio (PAPR) is high that it requires stringent linearity of power amplifier operation, where one of the figure-of-merit of linearity is the adjacent channel power ratio (ACPR). The tradeoff between the power-added efficiency and ACPR must be carefully taken in designing the dual-band power amplifier 241. The technique has been provided in co-pending U.S. patent application entitle "Dual-band power amplifier" by the applicant of the present invention, which is incorporated herein by reference.

The specifications of each sub-circuits of the transmitting unit 240 of the first module 110 are determined from the power and gain budget. For example, the specifications of the transmitting unit 240 of the first module 110 are in accordance with the IEEE 802.11a/b/g. The IF modulation/demodulation modules can use the RF 2948B chip of RFMD LTd. Since the acceptable ranges of output power of the RF 2948B are −5 dBm to −2 dBm, the first module 110 requires at least 18 dB gain at 5.2 GHz and 2.4 GHz in the transmitting module. In summary, the circuit specifications, such as gain, 1-dB gain-compressed power, and the third-order intercept-point power, of the transmitting unit 240 of the module 110 are determined according to the system power and gain budgets.

The first module 110 of the present invention uses the super-heterodyne transceiver topology. The suitable intermediate frequency $f_{IF}$ of the system is chosen first to achieve no close-in inter-modulation spurs generated from the mixers. These inter-modulation spurs and harmonics are suppressed by the first IF filter 235a and the second IF filter 235b. The first IF filter 235a and the second IF filter 235b are preferably implemented with the SAW filer having a bandwidth at least 22 MHz for satisfying the specifications of the IEEE 802.11a/b/g. The SAW filter named as TB374GD with the center frequency of 374 MHz is used in the present invention.

Figure 3:
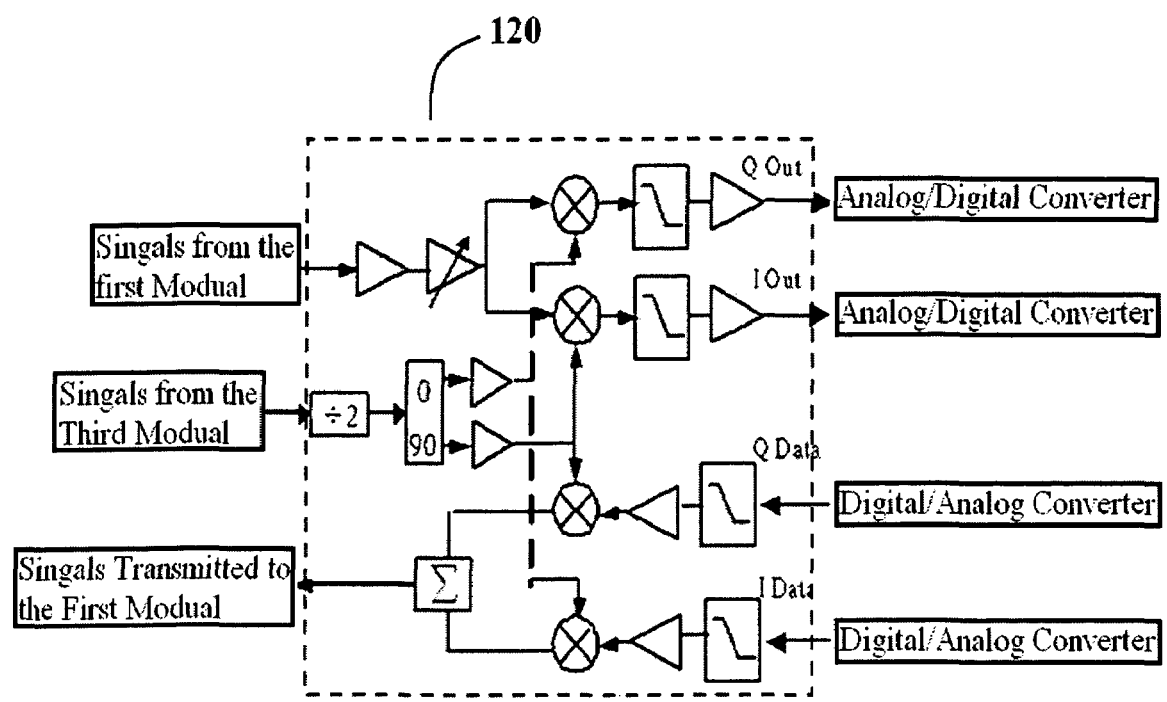
FIG. 3 shows a second module of the dual-band RF transceiver according to the present invention.

Referring to FIG. 3, it shows a second module 120 of the dual-band RF transceiver 100 according to the preferred embodiment of the present invention. The second module 120 is electrically connected to the first module 110 and used as the IF IQ modulator/demodulator of the dual-band RF transceiver. The second module 120 comprises a low-pass filter, used for inputting and outputting a base-band signal; an IQ down-mixer, used for down-converting the IF signal from the first module 110; and an IQ up-mixer for up-converting the base-band I and Q signals. The IF IQ modulator/demodulator of the second module 120 is shared by the IEEE 802.11b/g mode and IEEE 802.11a mode operations since the same IF frequency is chosen for both modes. In such a design consideration, the component count and power dissipation are effectively reduced. In the present invention, the second module with the functions of IF modulation/demodulation can use the RF 2948B chip of RFMD Ltd.

Figure 4:
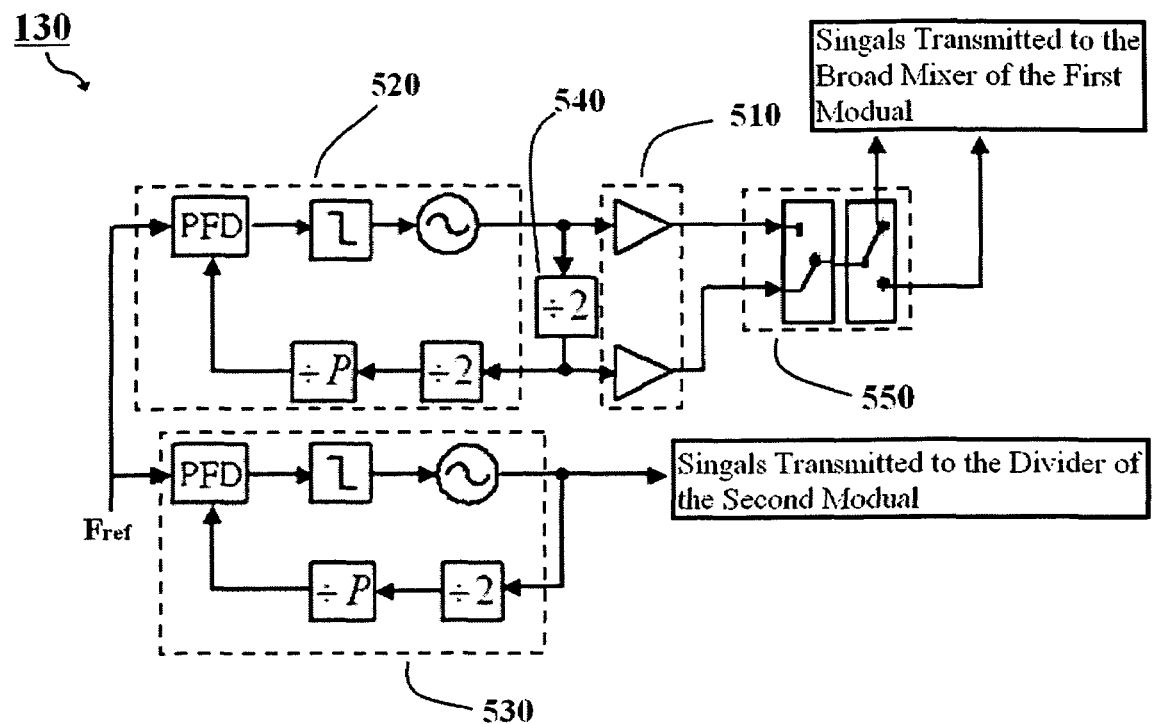
FIG. 4 shows a third module of the dual-band RF transceiver according to the present invention.

Referring to FIG. 4, it shows a third module 130 of the dual-band RF transceiver 100 according to the preferred embodiment of the present invention. The third module 130 is electrically connected to the first module 110 and the second module 120. The third module 130 is used as the triple-band phase-locked frequency synthesizer of the dual-band RF transceiver 100 and used for providing a first local oscillating signal and a second local oscillating signal to the first module 110, and a third local oscillating signal to the second module 120. The third module 130 comprises a buffer 510, a first phase-locked circuit 520, a second phase-locked circuit 530, a divider 540 and a band-selection and transmit/receive switch 550. The first phase-locked circuit 520 and the second phase-locked circuit 530 can use the conventional chip to implement, such as a dual-band frequency synthesizer chip named as LMX2330L. The divider 540 can use conventional chip such as chip of HMC361MS8G of Hittite Ltd.

When the frequency of oscillating signal from the first phased-locked circuit 520 is from 5554 to 5694 MHz, it is fed directly to the first broad mixer 234a and the second broad mixer 234b, through the band-selection and transmit/receive switch 550, to mix with the first RF signal to generate an IF signal of 374 MHz. When the frequency of oscillating signal of the first phased-locked circuit 520 is from 5572 to 5716 MHz, it is divided by the divider 540, resulting 2786 to 2858 MHz. Then the divided oscillating signal of 2786 to 2858 MHz is fed to the first broad mixer 234a and the second broad mixer 234b, through the band-selection and transmit/receive switch 550, to mix with the second RF signal to generate another IF signal of 374 MHz.

The testing results of the dual-band transceiver 100 of the present invention at the receive mode are described in the following. For the third-order intercept-point power (IP3) measurement, the input IP3 at 2.4 GHz and 5.2 GHz are −10 dBm and −20 dBm, respectively. For the input 1-dB-gain-compression power ($P_{1dB}$) testing, the input $P_{1dB}$ at 2.4 GHz and 5.2 GHz are −17 dBm and −28 dBm, respectively. For the gain testing, the gain at 2.4 GHz and 5.2 GHz are 20 dB and 31 dB, respectively. For the IF output power testing, the output power of the variable-gain amplifier are 0 dBm and 1 dBm, capable of driving the RF 2948B modulation/demodulation chip. For the noise figure testing, the noise figures at 2.4 GHz and 5.2 GHz are 9.8 dB and 9.5 dB, respectively.

The testing results of the dual-band transceiver 100 of the present invention at the transmit mode is described below. For the IP3 testing, the output IP3 at 2.4 GHz and 5.2 GHz are 32 dBm and 27 dBm, respectively. For the output $P_{1dB}$ testing, the output $P_{1dB}$ at 2.4 GHz and 5.2 GHz are 25 dBm and 20 dBm, respectively. For the gain testing, the gain at 2.4 GHz and 5.2 GHz are both 15 dB, respectively.

From the above description, the present invention integrates multiple dual-band circuits to implement the first module 110. The invention realizes the dual-band triple-mode operation of IEEE802.11 a/b/g by a single dual-band RF module. Therefore the circuit size, power dissipation, component count, and cost are dramatically reduced.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A dual-band RF transceiver, comprising:
a first module, used as the RF front-end of the dual-band transceiver and used for receiving and transmitting a first RF signal and a second RF signal;
a second module, electrically connected to the first module, used as an intermediate-frequency IQ modulator/demodulator of the dual-band RF transceiver; and
a third module, electrically connected to the first and the second modules, used as a triple-band phase-locked frequency synthesizer of the dual-band RF transceiver and used for providing a first local oscillating signal and a second local oscillating signal to the first module, and a third local oscillating signal to the second module,
wherein the first module is constructed from several dual-band circuits.

2. A dual-band RF transceiver as claimed in claim 1, wherein the first module comprising:
a dual-band RF filtering unit, electrically connected to a dual-band antenna, used for processing the first RF signal and the second RF signal and transmitting them among a dual-band receiving unit, a dual-band transmitting unit, and a dual-band antenna;
a dual-band receiving unit, electrically connected to the dual-band RF filtering unit, used for processing the first RF signal and the second RF signal and transmitting them to the second module; and a dual-band transmitting unit, electrically connected to the dual-band RF filtering unit, used for processing the first RF signal and the second RF signal from the second module.

3. A dual-band RF transceiver as claimed in claim 2, wherein the dual-band RF filtering unit comprising:

a dual-band antenna switch, used for switching the first RF signal and the second RF signal;

a dual-band RF filter, electrically connected to the dual-band antenna switch, used for filtering the first RF signal and the second RF signal; and a dual-band transmit/receive switch, electrically connected among the dual-band RF filter, the dual-band receiving unit and the dual-band transmitting unit, used for determining the signal direction of the first RF signal and the second RF signal.

4. A dual-band RF transceiver as claimed in claim 2, wherein the dual-band receiving unit comprising:

a dual-band low-noise amplifier, used for receiving the first RF signal and the second RF signal from the dual-band transmit/receive switch, amplifying the first RF signal and the second RF signal, and reducing the noise contribution from the following circuits;

a dual-band gain amplifier, electrically connected to the dual-band low-noise amplifier, used for amplifying the first RF signal and the second RF signal;

a first dual-band image filter, electrically connected to the dual-band gain amplifier, used for suppressing the images of the first RF signal and the second RF signal;

a first broadband mixer, electrically connected to the first dual-band image filter, used for mixing the first RF signal with the first local oscillating signal of the third module to generate a first intermediate frequency (IF) signal, and used for mixing the second RF signal with the second local oscillating signal of the third module to generate a second IF signal;

a first IF filter, electrically connected to the first broadband mixer, used for suppressing the spurious response generated by the first broadband mixer to obtain the first IF signal and the second IF signal; and a first variable-gain amplifier, electrically connected to the first IF filter, used for amplifying the first IF signal and the second IF signal and outputting the first IF signal and the second IF signal to the second module.

5. A dual-band RF transceiver as claimed in claim 4, wherein the first IF filter is a surface acoustic wave (SAW) filter.

6. A dual-band RF transceiver as claimed in claim 4, wherein the frequency of the first IF signal is equal to the frequency of the second IF signal.

7. A dual-band RF transceiver as claimed in claim 6, wherein the frequencies of the first IF signal and the second IF signal are near 374 MHz.

8. A dual-band RF transceiver as claimed in claim 6, wherein the frequencies of the third IF signal and the first IF signal are near 374 MHz.

9. A dual-band RF transceiver as claimed in claim 2, wherein the dual-band transmitting module comprising:

a second variable-gain amplifier, electrically connected to the second module, used for amplifying a third IF signal and a fourth IF signal from the second module;

a second IF filter, electrically connected to the second variable-gain amplifier, used for suppressing the spurious response generated by the second variable-gain amplifier to obtain the third IF signal;

a second broadband mixer, electrically connected to the second IF filter, used for mixing the third IF signal with the first local oscillating signal of the third module to generate the first RF signal;

a second broadband mixer, electrically connected to the second IF filter, used for mixing the fourth IF signal with the second local oscillating signal of the third module to generate the second RF signal;

a second dual-band image filter, electrically connected to the second broadband mixer, used for suppressing the spurious response generated by the broadband mixer;

a dual-band driving amplifier, electrically connected to the dual-band image filter, used for raising the power level of the first RF signal and the second RF signal from the second dual-band image filter;

a dual-band power amplifier, electrically connected to the dual-band driving amplifier, used for further raising the power level of the first RF signal and the second RF signal and then outputting to the dual-band transmit/receive switch.

10. A dual-band RF transceiver as claimed in claim 9, wherein the second IF filter is a SAW filter.

11. A dual-band RF transceiver as claimed in claim 9, wherein the frequency of the third IF signal is equal to the frequency of the first IF signal.

12. A dual-band RF transceiver as claimed in claim 1, wherein the first module uses the super-heterodyne topology.

13. A dual-band RF transceiver as claimed in claim 1, wherein the first RF signal is the RF signal of the 5.2 GHz IEEE 802.11a WLAN.

14. A dual-band RF transceiver as claimed in claim 1, wherein the second RF signal is the RF signal of the 2.4 GHz IEEE 802.11 b/g WLAN.

* * * * *